US005142777A

United States Patent [19]

Boyer et al.

[11] Patent Number: 5,142,777

[45] Date of Patent: Sep. 1, 1992

[54] PROGRAMMABLE TOOL FOR PROVIDING A STAGED ARRAY OF TERMINAL MEMBERS

[75] Inventors: Raymond D. Boyer, Enola; Donald L. Forker; Kenneth R. Parmer, both of Harrisburg, all of Pa.

[73] Assignee: AMP Incorporated, Harrisburg, Pa.

[21] Appl. No.: 799,495

[22] Filed: Nov. 27, 1991

[51] Int. Cl.[5] ........................ H01R 43/16; B23P 19/00

[52] U.S. Cl. ........................................ 29/884; 29/739; 29/741; 29/837

[58] Field of Search .................. 29/739, 837, 741, 889

[56] References Cited

U.S. PATENT DOCUMENTS

| | | | |
|---|---|---|---|
| 4,089,104 | 5/1978 | Barry et al. | 29/739 X |
| 4,186,982 | 2/1980 | Cobaugh et al. . | |
| 4,270,267 | 6/1981 | Bakermans | 29/739 X |
| 4,367,583 | 1/1983 | Baccei | 29/739 |
| 4,383,361 | 5/1983 | Kautz | 29/739 |
| 4,394,795 | 7/1983 | Goss | 29/739 |
| 4,420,882 | 12/1983 | Ritchie et al. | 29/837 |
| 4,447,948 | 5/1984 | Golinski et al. | 29/739 X |
| 4,553,322 | 11/1985 | Cappos et al. | 29/739 |
| 4,590,673 | 5/1986 | Dornes et al. | 29/739 X |
| 4,670,978 | 6/1987 | Fickes et al. | 29/739 X |
| 4,857,018 | 8/1989 | Pickles | 439/751 |

OTHER PUBLICATIONS

AMP Instruction Sheet IS 9125 released Jul. 31, 1985 for AMP Insertion Tool 58198.

*Primary Examiner*—Carl J. Arbes
*Attorney, Agent, or Firm*—Katherine A. Nelson

[57] ABSTRACT

A programmable tool for mounting a connector to a circuit board, the tool having a guide member with a plurality of apertures therein for receiving the leading ends of terminal members disposed in thhe connector and at least one plate member having first apertures therein aligned with selected ones of those in the guide member and defining selected deeper apertures. The leading end of the tool is positioned over the terminal members and as force is applied the selected deeper apertures allow the ends of corresponding terminal members received therein to extend further back within the tool than those of the other terminal members and hence are not pushed as far, whereby upon removing the tool from the mounted connector, the terminal members are arranged in a staged array.

10 Claims, 6 Drawing Sheets

PROGRAMMABLE TOOL FOR PROVIDING A STAGED ARRAY OF TERMINAL MEMBERS

FIELD OF THE INVENTION

This invention is related to tools for assembling electrical connectors and more particularly to tools used to mount electrical connectors to circuit boards.

RELATED APPLICATIONS

This application is related to U.S. patent application Ser. No. 07,799,496, filed Nov. 27, 1991, and which is assigned to the present assignee.

BACKGROUND OF THE INVENTION

Electrical connectors known as pin headers and receptacle connectors are often used to interconnect circuitry between daughter boards and a mother board or back plane. The interconnected circuitry may include ground, signal and power circuits. It is often desirable therefore to have selected ones of the circuit interconnected before the remaining circuits. For this reason the terminal members in the pin header are often arranged in a staged array such that selected ones of the pin terminal members are longer than the others and, therefore, make first and break last when mating or unmating the corresponding connectors.

One way of making such connectors is to supply pin terminal members of different lengths so that as the terminal members are disposed in the pin header housing, the longer ones are placed in the desired locations of the array. This method requires manufacturing of multiple lengths of terminal members as well as increasing the number of assembly steps required to manufacture the connector.

Another method used is to insert all terminal members that are to have a common length using an automatic process and then individually inserting terminal members that are to be longer. This method again requires a plurality of assembly steps to manufacture the connector as well as requiring the manufacturing and stocking of a number of connectors with different terminal arrangements and/or limiting the number of options available to the manufacturer of the circuit board assembly.

It is desirable, therefore, to provide a tool whereby an array of pin terminal members having a common length can be inserted into a header and the header mounted to the board such that the tool that mounts the connector to the board simultaneously arranges the terminal members in the desired staged array.

It is further desirable to have a tool that can be adjusted to provide a variety of different staged arrays using one size connector, thereby reducing the need to stock a large inventory of different parts.

SUMMARY OF THE INVENTION

Accordingly, the present invention is directed to a programmable tool for providing a staged array of terminal members in a connector that eliminates the problems and disadvantages of the prior art. The tool in accordance with the invention is used to mount a pin header connector to a circuit board and simultaneously create a desired staged array of pin terminal members in the connector. In the preferred embodiment the terminal members include a first connecting or pin portion and a second connecting portion including a compliant section. The staged array in the header includes at least first and second groups of pin terminal members, the first connecting portions of the first group of pin terminal members being higher than the second group of pin terminal members such that upon mating the pin header with a corresponding receptacle the first group of pin terminal members will mate first and break last when the connectors are unmated.

The tool includes a guide member having a transverse body section with a first array of apertures extending therethrough at all terminal locations and configured to non-engagingly receive all of the first and second groups of pin terminal members, at least a first plate member having a second array of apertures extending therethrough aligned with selected ones of the terminal locations corresponding to the desired pattern of the first group of pin terminal members, and a solid push member. The guide member is configured to be received in the pin header housing such that the pin portions of the terminal members are received within the respective first array of apertures and that upon full insertion of the tool into the housing cavity, the leading end of the guide member will engage the upper surface of the housing base. When force is applied to the tool to mount the connector to the board, the guide member exerts pressure against the base of the housing. As the downwardly exerted pressure forces the second connecting portions of the terminal members into the corresponding circuit board holes the resistance of the respective compliant terminal portions as the terminal members move into the board holes forces the respective pins upwardly to engage the pushing tool, the first group of pin terminal members being pushed through the body of the guide member and the first plate member and against the lower surface of the push member and the second group of pin terminal members being pushed into position by the lower surface of the first plate member until the connector is mounted to the board. When the connector is fully mounted and the tool is removed from the connector, the first group of pin terminal members extend above the second group of pin terminal members.

In the preferred embodiment of the tool, the tool further includes a second plate member having a third array of apertures extending therethrough in a desired pattern, certain ones of the third apertures being positioned at the selected ones of the terminal locations for non-engagingly receiving leading ends of the first group of terminal members, and others of the third apertures extending therethrough at selected others of the terminal locations for non-engagingly receiving leading ends of selected others of the terminal members. The third apertures define a third array of apertures and the selected others of the terminal members define a second group of terminal members. The second plate member is inserted into the tool below the first plate member such that the second group of terminal members extend through the apertures of the second plate member and a third group of terminal members will be pushed by the second plate member. In the fully mounted connector, the third group of terminal members are shorter than the second group.

The tool is particularly designed for use with terminal members having compliant pin portions such as those disclosed in U.S. Pat. Nos. 4,186,982 and 4,857,018, which have insertion forces in the range of about 20–40 pounds per terminal. Typically insertion requires applying force directly to the ends of the pin terminal to force the respective compliant sections into the board hole. Other compliant sections as well as terminal members configured to have an interference fit with the board holes are also suitable for use with this tool. The tool is further designed for use with a pin header having a housing with a terminal receiving passageway configured to allow a terminal to be inserted at a variety of depths while still being retained within the housing. Additionally, the force required to insert the complaint portion into the board needs to be greater than the force required to move the terminal within its respective housing passageway.

An alternative method for manufacturing a connector having a staged array of terminal members includes a first step of inserting a complete array of terminal members all having the same length into the pin header and/or onto the circuit board and a second step whereby selected terminal members are pushed from below the board or housing to move the selected terminal members upwardly within the board or housing such that the leading ends thereof extend above the remaining terminal members. A further alternative method is to insert the terminal members into the housing so that the leading ends thereof extend further into the mating area that is ultimately desired. The tool is used to create the staged array as the leading surface of the tool is moved downwardly to engage the surface of the housing, thereby moving the terminal members into their desired levels. When using either of these alternative methods, the terminal receiving passageway of the housing must be configured to allow movement of the terminal in a vertical direction within the housing.

The tool of the present invention may also be used to position terminal members in a staged array on a circuit board in the absence of a housing. Alternatively, the tool may also be used to position terminal members in a staged array in a connector housing wherein the terminal members will eventually be soldered to a board.

It is an object of the present invention to provide a tool that will insert a plurality of identical terminal members disposed within a connector housing into through-holes of a circuit board such that the mating portions of the terminal members will be in a staged array within the housing.

It is a further object of the invention to provide a means whereby a connector may be provided with a staged array of pin terminal members of a minimum amount of assembly steps.

It is another object of the invention to provide a programmable tool that may be readily modified by the user to provide a plurality of staged arrays of terminal members using the same basic pin header.

Embodiments of the present invention will now described by way of example with references to the accompanying drawings.

DETAILED DESCRIPTION OF THE DRAWINGS

Figure 1:
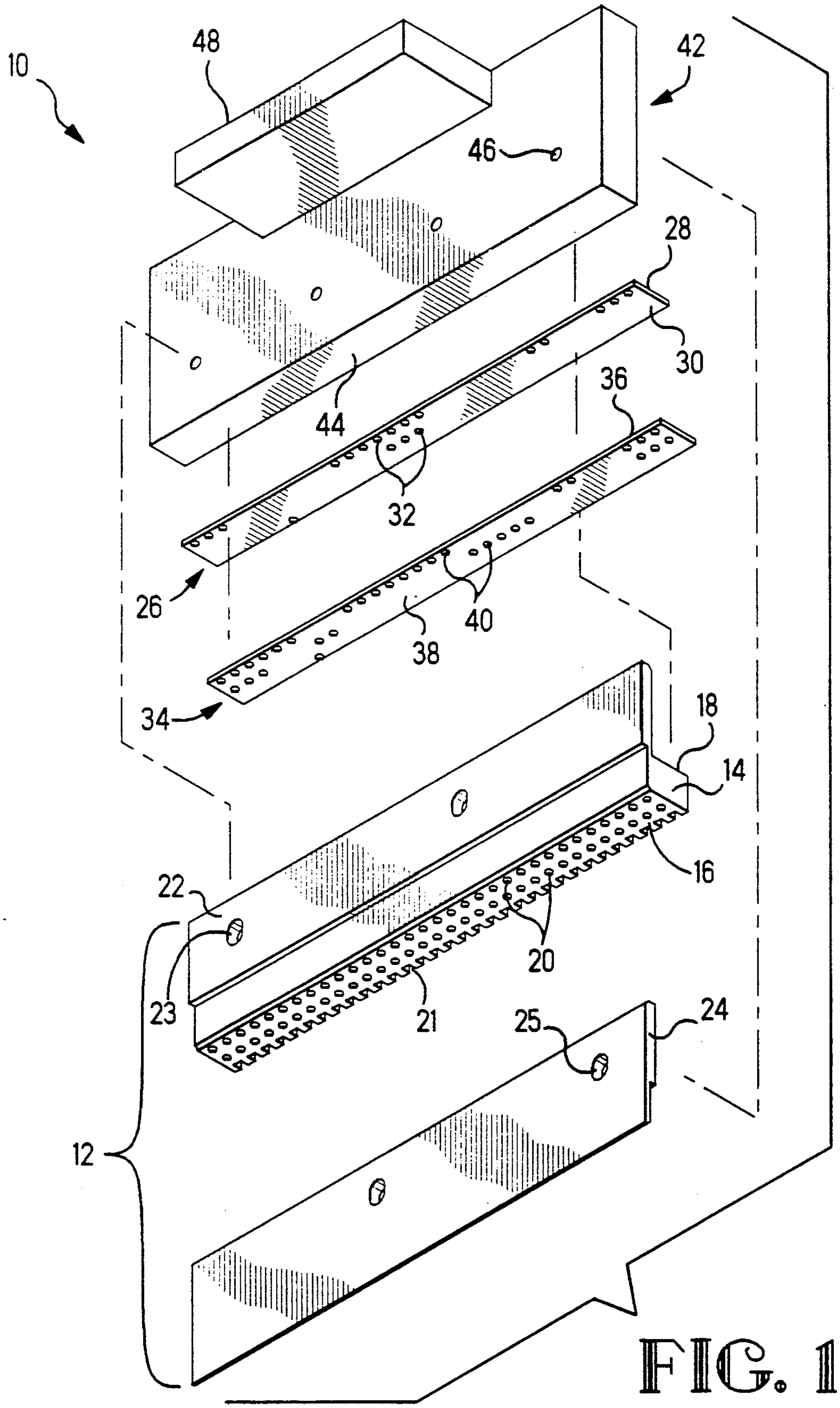
FIG. 1 is an exploded view of the tool of the present invention.
Figure 2:
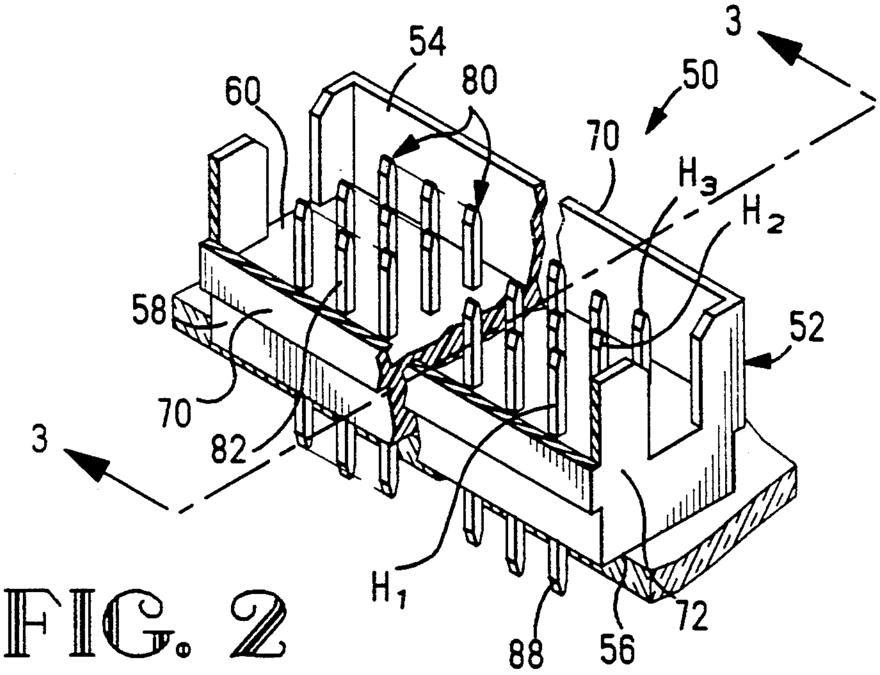
FIG. 2 is a perspective view of portions of a connector made with the tool of the present invention and mounted to a circuit board.
Figure 3:
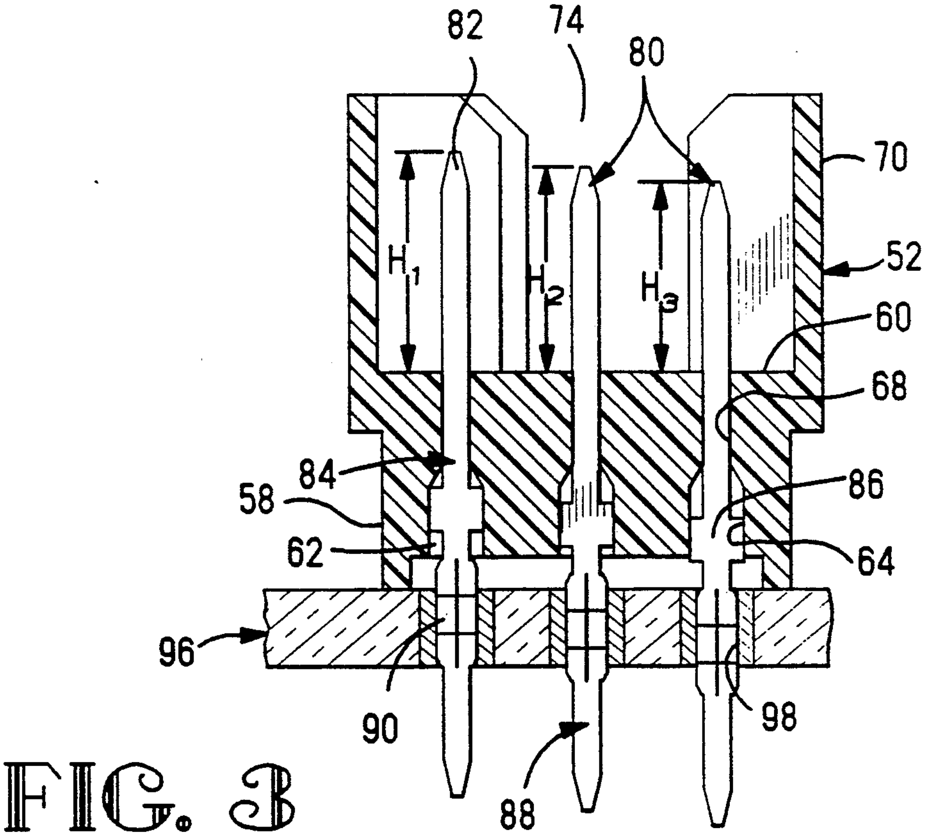
FIG. 3 is a cross sectional view of the connector of FIG. 2, taken along the line 3—3 thereof.

Referring now to FIGS. 1, 2 and 3, the tool 10 of the present invention is designed to be used with a pin header connector 50 having a housing 52 and a plurality of pin terminal members 80 disposed therein. For purposes of illustrating the invention, connector 50 includes three rows of terminal members 80.

Figure 4:
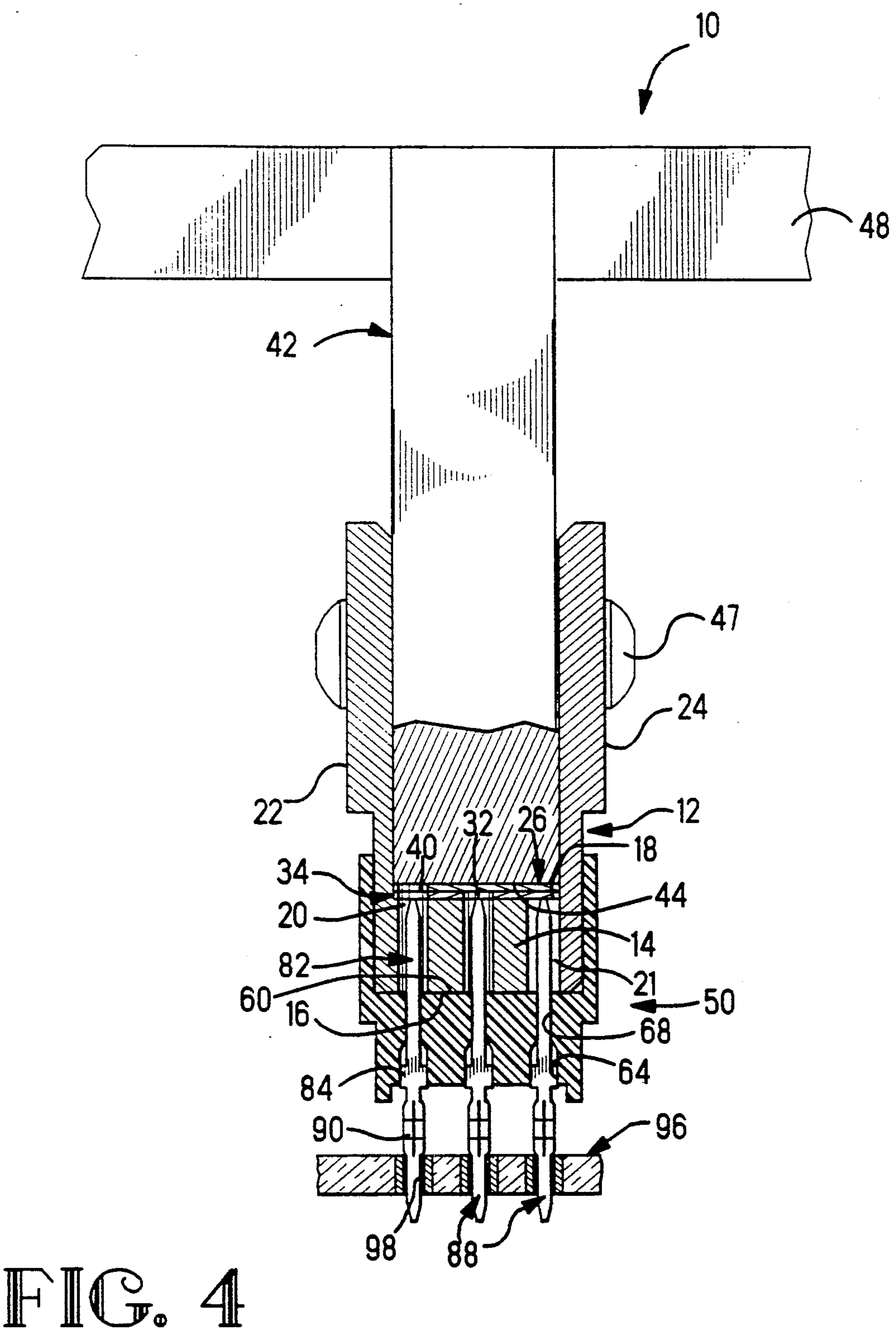
FIG. 4 is a cross sectional view of the connector of FIG. 3 prior to insertion on the circuit board and with the tool of the invention inserted into the connector housing.
Figure 5:
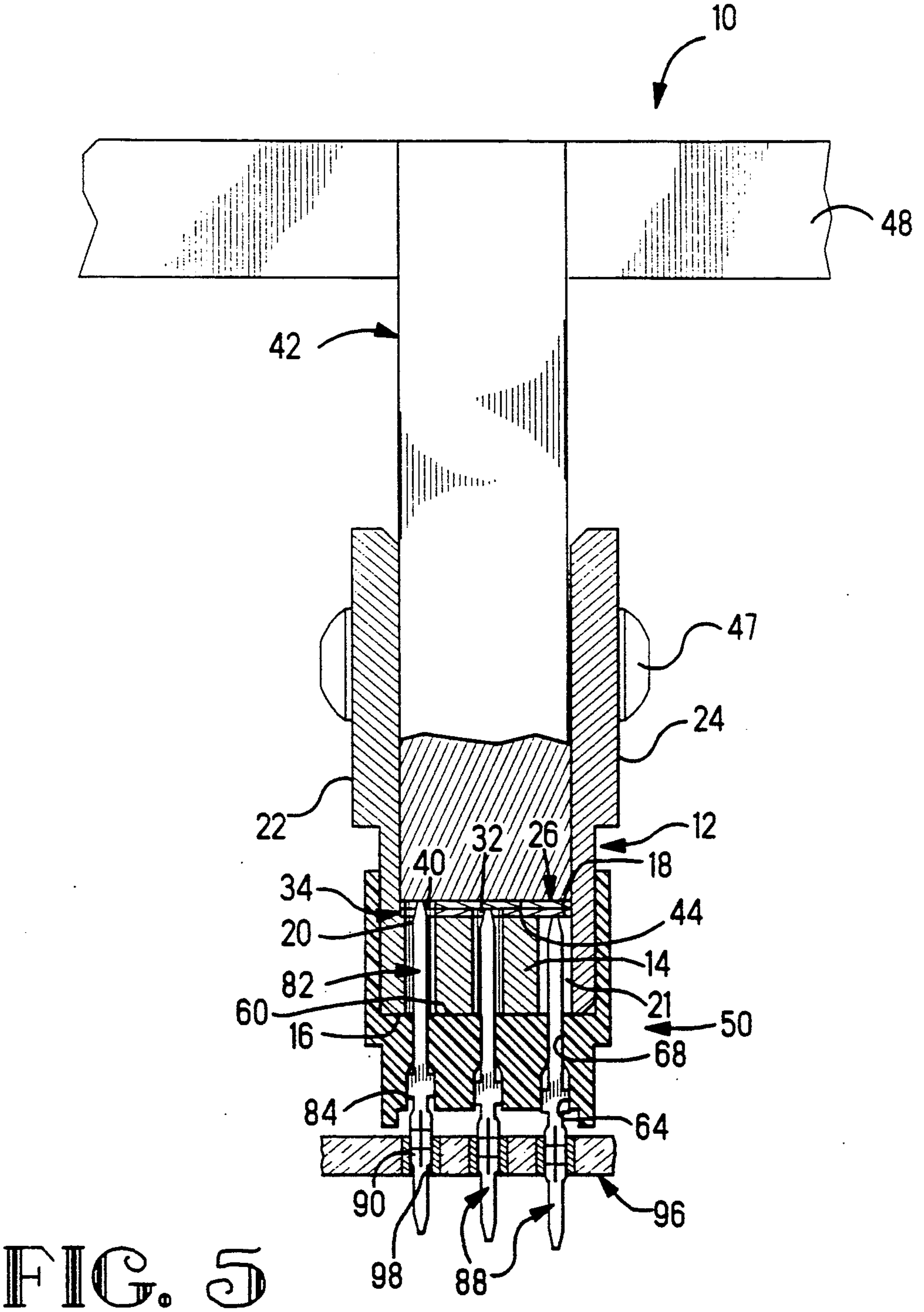
FIG. 5 is a view similar to that of FIG. 4 illustrating the operation of the tool as the connector is being mounted to the circuit board and having terminal members in a staged array.

As best seen in FIGS. 2 and 3, housing 52 includes a mating face 54, mounting face 56 and a base 58, side walls 70 and end walls 72 and is known in the art as a shrouded pin header. Base 58, side walls 70 and end walls 72 together define housing cavity 74. It is to be understood that a shrouded pin header is only one type of a connector that can be used with the tool of the present invention. As also seen in FIGS. 2 and 3, base 58 includes upper surface 60. Base 58 further includes a plurality of configured passageways 62 in which terminal members 80 are disposed. Passageways 62 include a lower enlarged portion 64 and an aperture 68 extending through the base 58. Terminal members 80 have a first or pin connecting portion 82, an intermediate portion 84 including retaining means 86 and second connecting portion 88. In the preferred embodiment second connecting portion 88 further includes a compliant section 90. As is shown in FIGS. 2 through 5, the mating area of connector 50 includes a staged array of the first group of terminal members 80 having a first height $H_1$, and second group of terminal members 80 having a height $H_2$ and a third group of terminal members 80 having a height $H_3$ with $H_1$ being greater than $H_2$ being greater than $H_3$. The second connecting portions 88 of the terminal members 80 are adapted to be received in corresponding apertures 98 of the circuit board 96 as shown in FIGS. 3, 4 and 5.

As shown in FIGS. 1, 4 and 5, tool 10 includes a guide member 12, a first plate member 26, a second plate member 34 and a push member 42. Guide member 12 includes a transverse body portion 14 having a leading surface 16 and an upper surface 18 and upwardly extending first and second side walls 22,24. The body portion 14 includes a plurality of apertures 20 extending between the leading and upper surfaces 16, 18, the array of tool apertures 20 being equal to that of the array of terminal members 80 in the connector with which the tool is to be used. In the preferred embodiment, the guide member 12 is made in two separate pieces, the body portion 14 and first side wall 22 being one piece and the second piece being second side wall 24. Tool member 10 may be made from a variety of materials such as hardened steel, aluminum, other metals, dielectric materials, and combinations of metal and dielectric materials or other suitable materials, as known in the art. For longer tool life, it is preferred that at least the parts that ultimately push against the metal terminal members, that is first and second plates 26, 34 and the leading portion of push member 42 be made from tool hardened steel or similarly hard material, as known in the art. For ease in manufacturing the part, the one side of body 14, as shown in FIG. 1, may include a plurality of slots 21, which in combination with side wall 24 form the third row of apertures shown in FIGS. 3 through 5. Side walls 22, 24 have apertures 23, 25 extending therethrough for receiving securing means 47 as shown in FIGS. 4 and 5.

The first plate member 26 has an upper surface 28 and lower surface 30 and a plurality of apertures 32 extending therebetween. The number of apertures of 32 correspond to the number of terminal members in the first group of terminal members. The lower surface of plate member 30 is adapted to insert the second group of terminal members to height $H_2$ in the assembled connector. As is shown in these Figures second plate member 34 includes an upper surface 36 and a lower surface 38 adapted to push the third group of terminal members into the circuit board to height $H_3$. Second plate member 34 further includes a plurality of apertures 40 for receiving leading ends of the first group of terminal members therethrough. Push member 42 includes a lower surface 44 adapted to push in first group of terminal members to height $H_1$ when the connector is mounted to the circuit board. Push member 42 further includes aperture 48 extending therethrough for receiving securing means 47 when the guide member 12 is attached to push member 42. In the embodiment shown herein, push member 42 further includes plate member 46 at the top surface thereof, which provides a surface for applying force to mount the connector 50 to the board.

Referring now to FIGS. 4 and 5, when the tool 10 is placed within the pin header 50 apertures 20 receive first connecting portions 82 of the pin terminal members 80. As the tool 10 is moved downwardly into position, the second connecting portions 88 of terminal members 80 are received in the corresponding circuit board holes 98. As the respective compliant terminal portions 90 abut the respective board holes 98, sufficient resistance occurs to cause the respective terminal 80 of the three groups to move upwardly against the respective push surfaces. The lower surface 30 of first plate member 26 for the third group of terminal members, the lower surface 38 of the second plate member 34 for the second group of terminal members and the lower surface 44 of push member 42 for the first group of terminal members. As force is applied and connector 50 is mounted to the circuit board 96, the terminal members 80 are pushed into the respective board holes 98 such that the compliant portions 90 engage the plated holes 98 within the circuit board 96. As can be seen from FIG. 3, the resulting pin terminal members 80 in housing cavity 74 are shown respectively in three different heights and the associated retentive retention means 86 of the terminal members 80 are located at three different positions within the enlarged passageway retaining portion 64 of the housing 52, as best seen in FIGS. 3 and 5. The location of the compliant pin portions are correspondingly staggered within the circuit board holes. Thus the same length terminal can be used but inserted into a circuit board at different heights.

In assembling the connector 50, the terminal members 80 are inserted into the housing 52 from the lower or mounting surface 56 thereof and positioned such that their corresponding retaining means 86 engage side walls of retaining portion 64 in respective passageways 62. The interference fit provided by retaining means 86 is sufficient to hold the terminal members 80 within the housing 52 prior to mounting connector 50 to the board but not of such strength to prevent the retaining means 86 from being moved in a vertical direction during mounting of the connector 50 to the circuit board 96.

Figure 6:
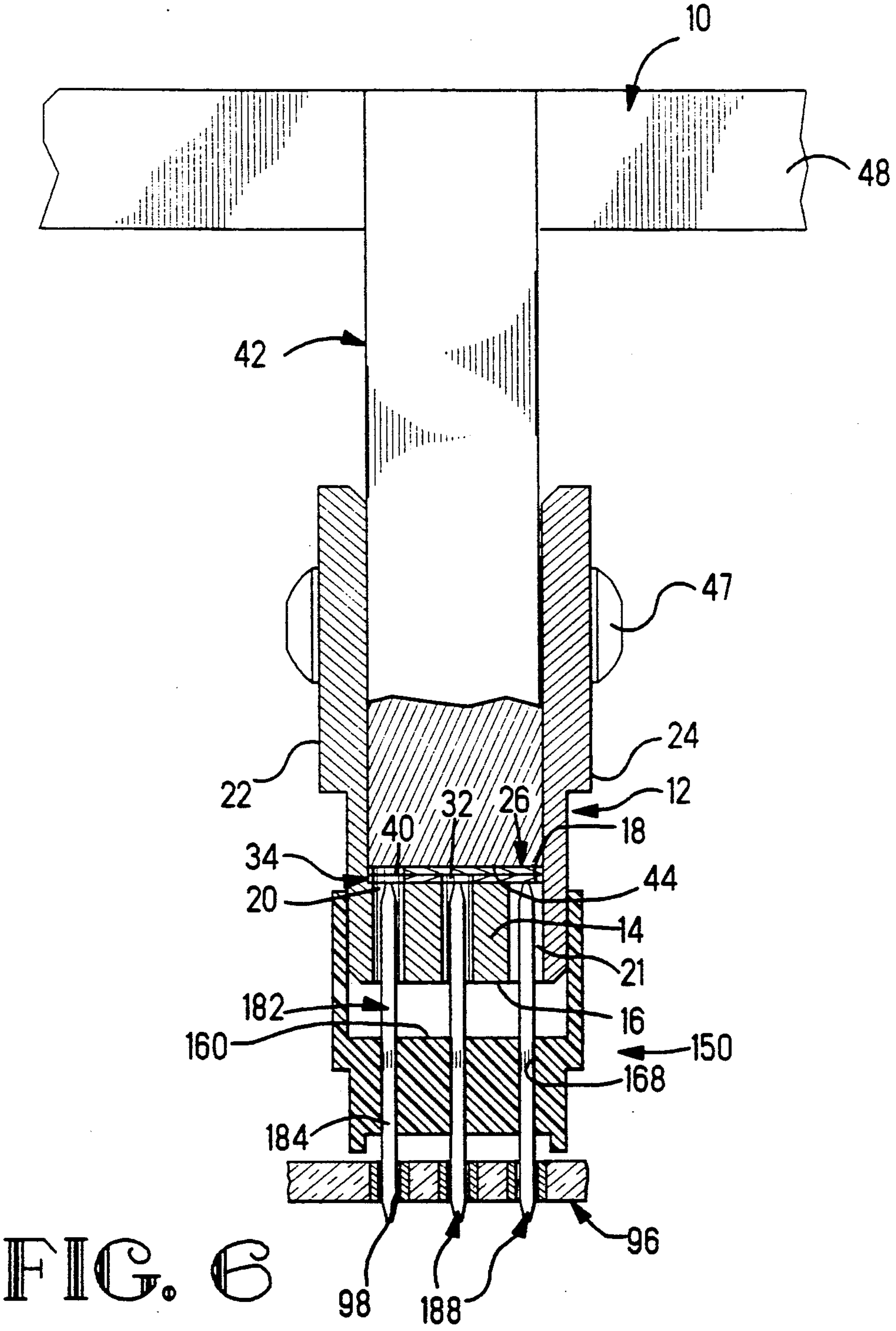
FIG. 6 is a cross sectional view of an alternative embodiment of the connector with the tool of the invention inserted into the connector housing and illustrating an alternative method of using the tool.
Figure 7:
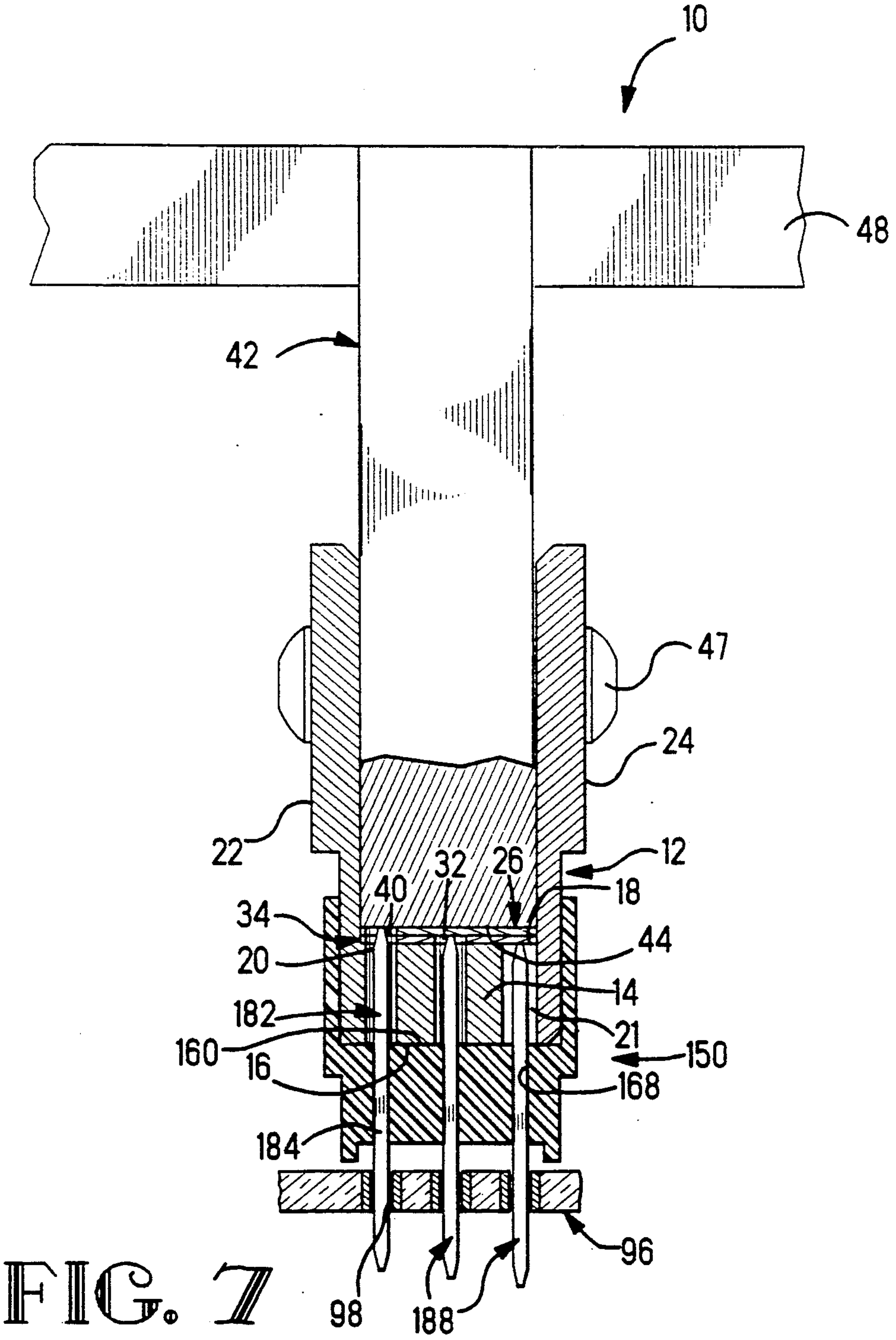
FIG. 7 is a view similar to that of FIG. 6 illustrating the operation of the tool as the alternative embodiment of the connector is being mounted to the circuit board and having terminal members in a staged array.

FIGS. 5 and 6 illustrate an alternative method of using the tool 10 of the present invention to form a staged array of terminal members at the mating face of connectoı 150. Connector 150 includes a plurality of terminal members 180, disposed in respective terminal-receiving passageways 162, each terminal member 180 having substantially the same cross-sectional dimension throughout its length. Terminal members 180 include first connecting portions 182, intermediate portions 184 and second connecting portions 188, shown for purposes of illustration, as solder tails. In assembling connector 150, terminal members 180 are inserted into their respective passageways so that the first connecting portions 182 extend a distance into the mating area that is greater than the ultimate desired heights. Tool 10 is then used to move the respective terminal members downwardly into the desired levels of height, $H_1$, $H_2$, and $H_3$, as the leading surface 16 of guide member 12 is brought into engagement with housing surface 160. In describing the preferred embodiment of the present invention there are two plate members used to provide three levels of height for the terminal members. It is to be understood that only one plate member need be used if the staged array is to include only two levels of height for the terminal members and more plate members if the staged array is to include more than three levels of height for the terminal members. It is to be understood that the configuration of the terminal receiving passageway and the thickness of the plate members will be adjusted accordingly.

As can be seen from the foregoing discussion, the tool of the present invention is programmable in that the locations of holes in the first and other plate members may be adjusted in accordance with the desired arrangement of mate first/break last pin terminal members. A new arrangement is readily obtained by replacing the member with a plate member having another desired array of apertures. Thus a user of the connector need only stock one connector of a given size while maintaining the ability to customize the staged arrangement of the terminal members at the mating face.

It is thought that the tool of the present invention and many of its attendant advantages will be understood from the foregoing description. It will be apparent that various changes may be made in the form, construction and arrangement of the parts thereof without departing from the spirit or scope of the invention or sacrificing all of its material advantages.

We claim:

1. A programmable tool for mounting a connector to a circuit board, said connector including a housing having a plurality of terminal-receiving passageways at respective locations and extending from a mounting to a mating face and a plurality of terminal members disposed within respective ones of said passageways in interference fit and movable therealong during circuit board mounting, the terminal members having first connecting portions exposed at said mating face for mating with corresponding terminal members of a complementary connector and second connecting portions extending from said mounting face and adapted to be electrically connected with contact means of said circuit board, at least first selected ones of said terminal members having their first connecting portions thereof ultimately disposed at different heights from first connecting portions of others of said terminal members, said tool comprising:

a guide member having a transverse body portion including opposed leading and rear surfaces and having first apertures extending therethrough at all terminal locations and defining a first array, said first apertures being adapted to non-engagingly receive therethrough corresponding first connecting portions of all of said terminal members;

at least a first plate member having opposed forward and rearward surfaces and having second apertures extending therethrough at selected ones of said terminal locations defining a second array, said forward surface of said first plate member being disposed rearwardly of said guide plate and at least proximate said rear surface thereof, said second apertures of said second array being aligned with corresponding first apertures of said first array and adapted to non-engagingly receive therethrough leading ends of said at least first selected ones of said terminal members after said at least first selected ones exit said corresponding first apertures of said guide members, said at least first selected ones defining a first group of terminal members;

a push member having a solid leading surface disposed rearwardly of said at least first plate member and at least proximate said rearward surface of said first plate member; and means for securing said guide plate and said push member together with said at least first plate member being retained transversely therebetween defining a tool, such that upon positioning the second connecting terminal portions with said contact means of said circuit board and positioning and aligning said leading end of said tool guide member at least proximate said mating face of said connector housing, leading ends of all said terminal members are non-engagingly received within respective said first array apertures and upon applying downward force against said tool, said second connecting portions of said terminal members engage said contact means of said circuit board and as pressure is continued to be applied downwardly on the tool the resistance of said second connecting terminal portions as they engage respective said contact means forces respective said first connecting portions upwardly toward said tool, such that said first connecting portions of said at least first group of terminal members are moved through respective said second apertures of said second array and are pushed by said leading surface of said push member and others of said terminal members are pushed by said forward surface of the said at least first plate member as said tool mounts the connector to said circuit board, whereby upon removal of said tool from said connector housing, said terminal members are in a staged array with said first connecting portions of said first group of terminal members being higher than those of said other terminal members.

2. The programmable tool of claim 1 wherein said contact means of said circuit board are through-holes.

3. The programmable tool of claim 2 wherein said second connecting portions of said terminal pins are adapted to be received in said circuit board through-holes.

4. The programmable tool of claim 3 wherein said second connecting portions of said terminal members include compliant sections.

5. The programmable tool of claim 1 further including at least a second plate member having opposed forward and rearward surfaces, said forward surface of said at least second plate member being disposed rearwardly of said guide plate and said at least second plate member between said first plate member and said guide member, said at least second plate member having third apertures extending therethrough, certain ones of said third apertures being positioned at said selected ones of said terminal locations for non-engagingly receiving leading ends of said first group of terminal members, and others of said third apertures extending therethrough at selected others of said terminal locations for non-engagingly receiving leading ends of selected others of said terminal members, said third apertures defining a third array of apertures and said selected others of said terminal members defining a second group of terminal members, and upon mounting said connector to said circuit board, said first and second groups of terminal members are moved upwardly in their respective terminal passageways such that leading ends of said first terminal group pass through respective said guide and said first and second plate apertures to engage said leading surface of said push member and said leading ends of said second terminal group pass through said guide and second plate apertures to engage said leading surface of said first plate member, whereby upon removal of said tool from said housing, said terminal members all in a staged array with said first connecting portions of said first group of terminal members being higher than those of said second group of said terminal members and said first connecting portions of said second group of terminal members being higher than those of said others of said terminal members.

6. The programmable tool of claim 5 wherein said contact means of said circuit board are through-holes.

7. The programmable tool of claim 6 wherein said second connecting portions of said terminal pins are adapted to be received in said circuit board through-holes.

8. The programmable tool of claim 7 wherein said second connecting portions of said terminal members include compliant sections.

9. A method for forming a staged array of terminal members in a connector, said method comprising the steps of:

selecting a connector including a housing having a plurality of terminal-receiving passageways at respective locations and extending from a mounting to a mating face and a plurality of terminal members disposed within respective ones of said passageways in interference fit and movable therealong, the terminal members having first connecting portions exposed at said mating face for mating with corresponding terminal members of a complementary connector and second connecting portions extending from said mounting face and adapted to be electrically connected with contact means of said circuit board, at least first selected ones of said terminal members having their first connecting portions thereof ultimately disposed at different heights from first connecting portions of others of said terminal members;

providing a guide member having a transverse body portion including opposed leading and rear surfaces and having first apertures extending therethrough at all terminal locations and defining a first array, said first apertures being adapted to non-engagingly receive therethrough corresponding first connecting portions of all of said terminal members;

providing at least a first plate member having opposed forward and rearward surfaces and having second apertures extending therethrough at selected ones of said terminal locations defining a second array;

disposing said forward surface of said first plate member rearwardly of said guide plate and at least proximate said rear surface thereof such that said second apertures of said second array are aligned with corresponding first apertures of said first array and adapted to non-engagingly receive therethrough leading ends of said at least first selected ones of said terminal members after said at least first selected ones exit said corresponding first apertures of said guide members, said at least first selected ones defining a first group of terminal members;

disposing a push member having a solid leading surface rearwardly of said at least first plate and at least proximate said rearward surface of said first plate member;

securing said guide plate and said push member together with said at least first plate member being retained transversely therebetween defining a tool;

positioning said leading end of said tool guide member at least proximate said mating face of said connector housing such that said leading ends of all said terminal members are non-engagingly received within respective said first array apertures; and applying downward force against said tool such that such that said first connecting portions of said at least first group of terminal members are moved through respective said second apertures of said second array and are pushed by said leading surface of said push member and others of said terminal members are pushed by said forward surface of the said at least first plate member as said tool moves into the connector, whereby upon removal of said tool from said connector housing, said terminal members are in a staged array with said first connecting portions of said first group of terminal members being higher than those of said other terminal members.

10. The method of claim 9 further including the step of providing at least a second plate member having opposed forward and rearward surfaces, said at least second plate member having third apertures extending therethrough, certain ones of said third apertures being positioned at said selected ones of said terminal locations for non-engagingly receiving leading ends of said first group of terminal members, and others of said third apertures extending therethrough at selected others of said terminal locations for non-engagingly receiving leading ends of selected others of said terminal members, said third apertures defining a third array of apertures and said selected others of said terminal members defining a second group of terminal members, disposing said forward surface of said at least second plate member rearwardly of said guide plate and said at least second plate member between said first plate member and said guide member, and upon mounting said connector to said circuit board, said first and second groups of terminal members are moved upwardly in their respective terminal passageways such that leading ends of said first terminal group pass through respective said guide and said first and second plate apertures to engage said leading surface of said push member and said leading ends of said second terminal group pass through said guide and second plate apertures to engage said leading surface of said first plate member, whereby upon removal of said tool from said housing, said terminal members all in a staged array with said first connecting portions of said first group of terminal members being higher than those of said second group of said terminal members and said first connecting portions of said second group of terminal members being higher than those of said others of said terminal members.

* * * * *